E. G. HASTINGS.
Hay-Rake and Loader.
No. 204,567.          Patented June 4, 1878.
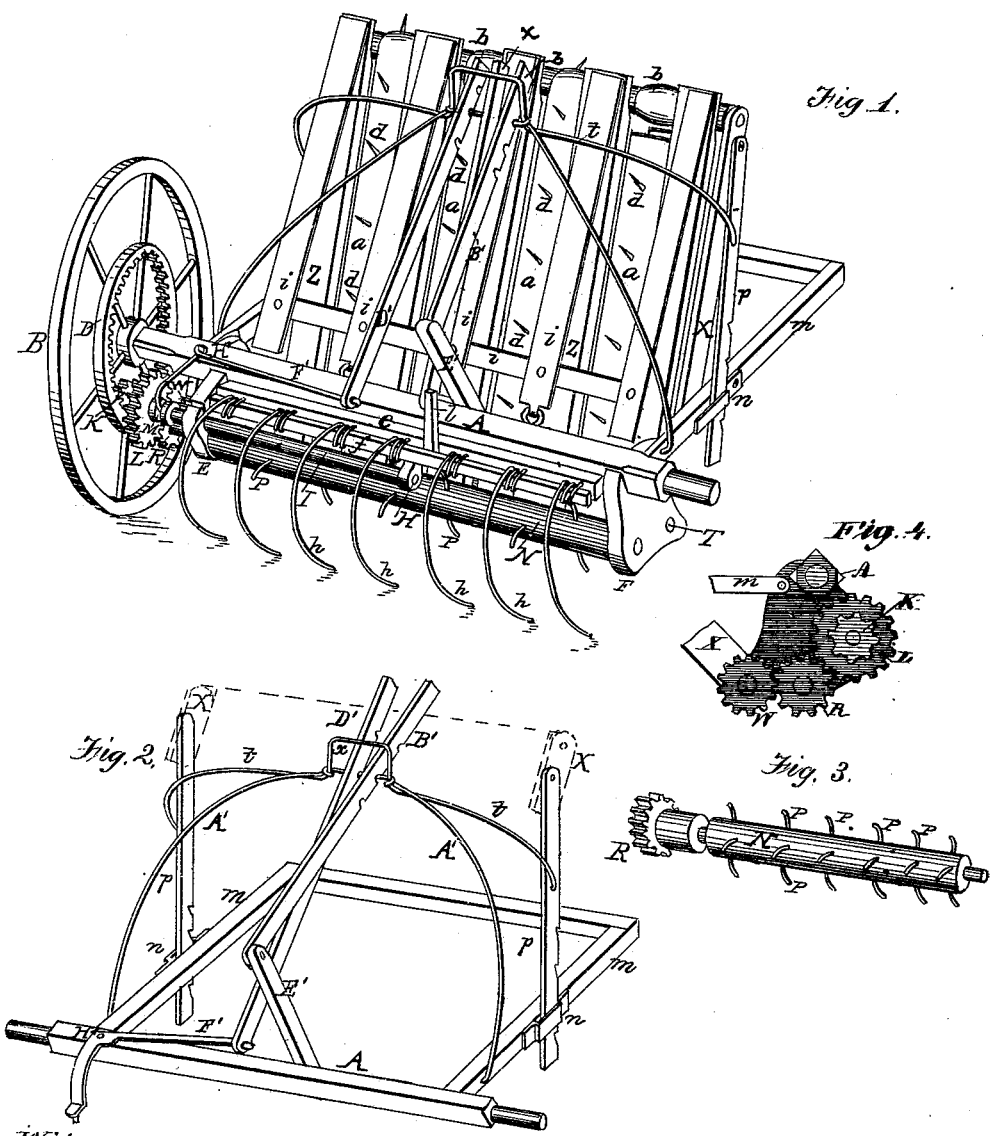
Witnesses;
Joel. S. Edwards,
Randolph Foster Marshall.
Inventor
Edwin. G. Hastings.

UNITED STATES PATENT OFFICE.

EDWIN G. HASTINGS, OF GILMAN, IOWA.

IMPROVEMENT IN HAY RAKE AND LOADER.

Specification forming part of Letters Patent No. 204,567, dated June 4, 1878; application filed February 4, 1878.

*To all whom it may concern:*

Be it known that I, EDWIN G. HASTINGS, of Gilman, Marshall county, in the State of Iowa, have invented certain Improvements in Hay Rake and Loader Combined, of which the following is a specification:

The invention relates to an improvement in hay rake and loader; and consists in the devices hereinafter specifically described, the object being to furnish a suitable machine for raking the hay and placing it upon a wagon or other device, as desired.

Referring to the accompanying drawings, Figure 1 is a perspective view of a device embodying the elements of the invention. Fig. 2 is a like view of the elevator-frame detached from the machine. Fig. 3 is a detached perspective view of the beater and picker. Fig. 4 is a detached side view of the gear-wheels K L R W.

In the accompanying drawings, A represents the axle of the machine, provided with the wheels B for conveying the same from place to place. Upon the inside face of one of the wheels B, is secured the internally-toothed gearing D, the purpose of which will be set forth hereinafter.

To the lower portion of the axle A, near its ends, are secured the dependent lugs E F, and at its center the lug H, as shown. In the lugs E H is mounted the axle I, upon the end of which is secured the gear-wheel K, which meshes with the gearing D.

Upon the axle I, between the edge of the machine and wheel K, is loosely placed the gear-wheel L, which is provided with an annular groove, M, on one end, and with suitable teeth on the other, which teeth are designed to mesh with the similarly-constructed teeth on the side of the wheel K when the two wheels are in contact with each other, and thereby form a clutch, by means of which the said wheel L may remain dormant on its axle, or be caused to revolve with the wheel K.

At a proper distance below the axle I is mounted in the lugs E F the axle N, which is provided at suitable points on its periphery with the teeth P, and on one end with the cog-wheel R, the teeth of which engage the cog-wheel L, whereby motion is imparted to the said axle I. The teeth P are furnished to beat and pick the hay, and thereby clear it of trash.

In the lower extremity of the lugs E F is journaled the shaft T, which is furnished on one end with the cog-wheel W, and, near the edges of the lugs, with the side stretchers of the elevator-frame X, connected by suitable braces, and provided on its upper surface with the slatted frame Z, up which the grain is conveyed by the endless elevator-belts *a*, which rotate on the axles T *b* between the slats of the frame Z, and are furnished with the pins or teeth *d*, to catch and retain the grain in the operation of elevating it. The axle *b* is loosely mounted in the upper end of the frame X, and corresponds with the axle T in size and general construction.

In the rear of the axle A is pivoted or otherwise secured the bar *e*, which is provided with, and properly separated from, the auxiliary bar *f*, around which one end of the rake-teeth *h* is wound and secured in the bar *e*. The said rake-teeth are in the form of a segment of a circle, as shown, so that they will readily and effectively gather the grain. The bar or handle *l* is furnished to adjust the rake on any angle desired.

To the front edge of the axle A is loosely attached the rear end of the auxiliary frame *i*, which spreads over the upper portion of the elevator-frame X, and is furnished to prevent the grain while being elevated from falling rearward upon the machine or being blown from the machine by wind and again passing to the ground.

Upon each side of the elevator-frame the frame *m* is secured, being pivoted just in front of the axle A, and is provided as a means of coupling the machine to the hind axle of the wagon, to which it is to be attached in the operation of elevating grain. Thus the horses that draw the wagon also serve to convey the present device.

The hangers *n* are secured to the sides of the frame *m*, and receive the bars *p*, pivoted to the front of the elevator-frame, and furnished with notches on their lower edges, as shown, which notches mesh with the edges of the hangers, and thereby afford a means of inclining the elevator and retaining it in such position.

In the edges of the bars *p* are secured the ends of the bail *t*, which bows over the top of the machine, and at its center is bent so as to form the jaw $x$, mentioned hereinafter. Upon the pivots which secure the frame $m$ to the machine are secured the ends of the bail $A'$, which also bows over the machine, and at its center is wound around the bail $t$ at the lower part or base of the jaw $x$, as shown.

The jaw $x$ receives the front ends of the levers $B'$ $D'$, which extend rearward, the lever $B'$ being secured to the upper end of the arm $E'$, which is rigidly secured to the axle $A$, and the lever $D'$ being fastened to one end of the bell-crank lever $F'$, which is pivoted at $H'$, and has the end of its short arm set in the annular groove $M$ of the wheel $L$. The lower edges of the levers $B'$ $D'$ are provided with notches, which catch upon the edge of the bail $A'$ or base of the jaw $x$, thus retaining them in the position desired.

It is obvious that if the lever $D'$ were drawn forward, it would move the bell-crank lever $F'$ in a corresponding direction, and thus force the short arm of the said lever toward the center of the machine. This causes the wheel $L$ to disengage itself from the wheel $K$, and thereby lose its own motion and stop the rotation of the wheel $R$ and axle $N$. If the above movement of the lever $D'$ were reversed, the wheel $L$ would receive motion from the wheel $K$, and a contrary result would be effected.

By drawing the lever $B'$ the front portion of the machine is elevated, and with it the bars $p$. Thus the operator can adjust the said bars, when desired, without dismounting. The bails $t$ $A'$, being strongly constructed, also serve to strengthen the whole structure.

If desired, a shield or strip of sheet-iron can be placed around the gearing of the machine, to prevent straw or hay or the clothes of the operator becoming entangled.

The movement of the wheels $B$ is communicated to the gear-wheel $K$, and through it to the gear-wheels $L$ $R$ $W$ and shafts $N$ $T$, which latter shaft, revolving, imparts a corresponding motion to the elevator-belts $a$ and shaft $b$. Thus the grain as it is gathered by the rake is elevated by the belts $a$ to the rear of the wagon to which the machine is attached.

What I claim as my invention, and desire to secure by Letters Patent, is—

The bails $A'$ $t'$, in combination with the standards $p$, hangers $n$, and frame $m$, substantially as set forth.

EDWIN G. HASTINGS.

Witnesses:
JOEL S. EDWARDS,
RANDOLPH FOSTER MARSHALL.